July 26, 1960
H. S. BLOCH
2,946,652
GAS PURIFICATION PROCESS
Filed June 27, 1957
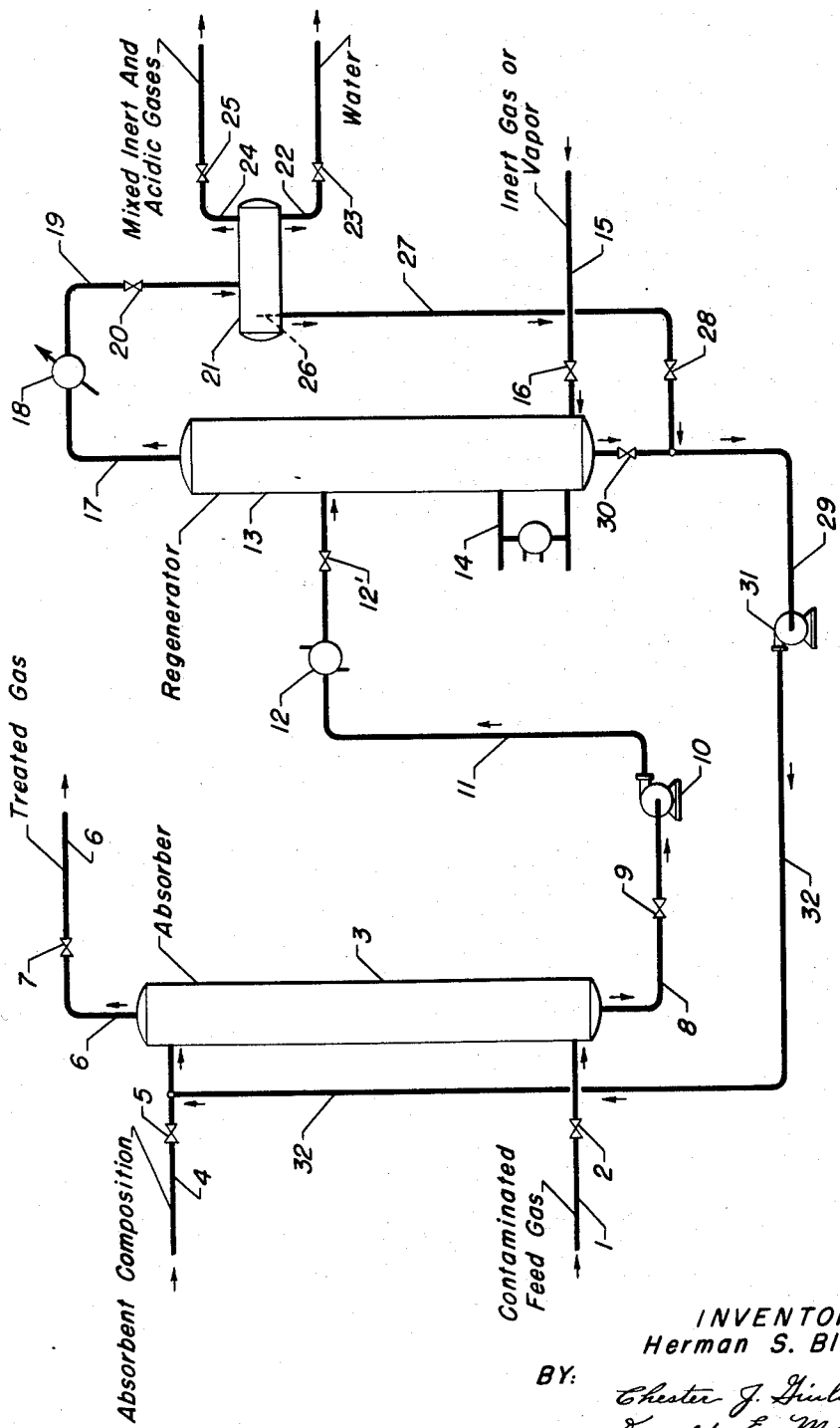
INVENTOR:
Herman S. Bloch
BY: Chester J. Giuliani
Donald E. Moehling
ATTORNEYS:

United States Patent Office 2,946,652
Patented July 26, 1960

2,946,652
GAS PURIFICATION PROCESS

Herman S. Bloch, Skokie, Ill., assignor, by mesne assignments, to Universal Oil Products Company, Chicago, Ill., a corporation of Delaware Filed June 27, 1957, Ser. No. 668,435

11 Claims. (Cl. 23—3)

This application is a continuation-in-part of my copending application Serial No. 401,421, filed December 30, 1953, now abandoned.

This invention relates to a method for treating normally gaseous streams containing acidic gaseous components for the removal of one or more of such acidic gases and for producing a resulting treated gaseous effluent which is not only free of the acidic contaminant, but also substantially free of moisture. In one of its more specific applications, the present invention concerns a gas-washing process for the removal of one or more acidic gaseous contaminants selected from the group consisting of hydrogen sulfide, carbon dioxide, and sulfur dioxide from a mixture of gases, while maintaining the gaseous stream in a substantially anhydrous condition, utilizing as the gas-washing agent a solution of an organic amine dissolved in a substantially anhydrous glycol, glycol ether or glycol ester.

In many organic conversion processes utilizing a gaseous reactant, particularly in certain processes for converting hydrocarbons by passing the same with the gaseous reactant over or through a catalytic agent, in many cases it becomes essential for economy reasons to recycle one of the gaseous reactants in order to maintain the molar ratio of the latter gas and the conversion reaction at a high level, and yet conduct the conversion in the absence of any substantial quantity of water or certain other gaseous contaminants, such as an impurity introduced into the recycle gas a result of being formed during the conversion process from an undesired component in the feed stock supplied to the process. Thus, in the polymerization of olefinic gases, such as ethylene, propylene, butylene and isobutylene utilizing a catalytic agent such as aluminum chloride, sulfuric acid, phosphoric acid or an acidic phosphate catalysts, it has been demonstrated that a more desirable product, formed in a greater yield per pass of feed stock through the catalyst chamber is realized from the process when the light olefinic gases are substantially anhydrous and contain no substantial proportion of hydrogen sulfide or other acidic gaseous contaminants which alter the activity of the catalyst. Since at least a portion of the product comprises unconverted gaseous feed stock which must ordinarily be recycled to the reactor because of incomplete conversion in one pass through the catalyst, the unconverted portion of the gases must generally be freed of moisture and other undesirable contaminants formed from impurities present in the feed stock or picked up during the operation of the process before recycling the gases to the catalyst chamber; otherwise, the catalyst undergoes rapid deactivation and other deterioration. Another industrial process in which the presence of acidic gases and moisture in the feed stock is undesirable is the catalytic reforming of certain naphtha fractions in the presence of a hydrocracking type catalyst, such as a combined platinum-alumina-halogen catalyst, in which process excessive amounts of hydrogen sulfide, sulfur dioxide and/or water in the feed mixture charged to the reaction vessels containing the catalyst are undesirable contaminants which adversely affect the activity of the catalyst. The process is generally effected in the presence of hydrogen supplied at least in part from a recycle hydrogen stream separated from the products of the conversion reaction. The naphtha feed stocks to the catalytic reforming process are generally unavoidably contaminated with sulfur compounds present in the original petroleum stock which generate hydrogen sulfide during the catalytic conversion and this hydrogen sulfide makes its appearance in the catalytic reactors in admixture with the recycled hydrogen, unless removed from the recycle stream prior to use in the reactor. In order to purify the latter recycle gas of it hydrogen sulfide content, a method of removing the hydrogen sulfide must be provided which will not humidify or introduce water vapor into the recycle gas stream prior to its introduction into the catalytic chambers of the primary conversion process. The substantial absence of water in the present gas-washing agent, as distinguished from washing agents containing any appreciable quantity of water, results in special advantages in a process utilizing a recycle gas stream which must be maintained in a substantially anhydrous condition.

It is an object of the present invention to provide a means of treating or washing normally gaseous streams containing an acidic component to thereby provide an effluent, washed gas stream in substantially anhydrous condition which is thus available for immediate recycling to the conversion process in which the purified gas stream is to be utilized in a form as anhydrous as possible.

In one of its embodiments the present invention relates to a combined absorption-absorbent regeneration process for treating a contaminated feed gas containing an acidic gaseous component which comprises contacting said feed gas with an absorbent composition comprising an organic amine, a substantially anhydrous, hydrophilic glycol compound and a hyrocarbon at least partially soluble in said glycol compound to thereby form a rich absorbent composition and a treated gas stream substantially free of moisture and said acidic gas component, separating said treated gas stream from said rich composition, separately distilling said rich composition until the resulting residue contains not more than 0.5% by weight of water and is substantially free of acidic gas, separating a resulting overhead into an acidic gas stream and a separate phase comprising said hydrocarbon and thereafter combining said hydrocarbon with the residue of said sorbent composition and recycling the resulting lean sorbent composition to contact with said feed gas.

A more specific embodiment of the invention relates to a process for removing hydrogen sulfide from a hydrogen recycle gas stream which comprises countercurrently washing said gas stream with an absorbent composition containing not more than about 0.5% by weight of water and comprising a substantially anhydrous solution of alkyl amine containing from 6 to about 18 carbon atoms in diethylene glycol and benzene at a temperature and pressure sufficient to maintain said solution in substantially liquid phase, thereafter separating a treated recycle hydrogen stream from a resulting rich absorbent composition containing said hydrogen sulfide, distilling from said rich composition sufficient benzene to substantially free said composition of hydrogen sulfide and to reduce its water content to not more than about 0.5% by weight, separating the resulting overhead into an aqueous stream and a benzene stream, combining said benzene with the resulting regenerated absorbent composition and recycling the resulting regenerated absorbent composition to said countercurrent washing step.

In accordance with the process of the present invention a gas fraction contaminated with an acidic gaseous component is contacted, preferably under countercurrent flow conditions with a liquid absorbent composition comprising a substantially anhydrous glycol compound having dissolved therein an organic amine capable of reacting with the acidic component of the gas stream under essentially anhydrous conditions maintained during the process to provide a purified gas product substantially free of both water and acidic gaseous contaminant. The rich absorbent composition recovered from the washing step is generally removed to a regeneration zone wherein the amine salt of the acidic gas component formed during the washing procedure is separately decomposed to regenerate the lean amine-glycol absorbent in a form suitable for recycling in successive washing cycles. In accordance with the process herein provided, the lean absorbent composition also contains a liquid hydrocarbon at least partially soluble in the amine-glycol solution; the addition of the hydrocarbon to the absorbent composition increases the efficiency of the washing step and provides a component of the "spent" absorbent composition which may be readily distilled therefrom, thereby stripping the water and acidic gas from the spent composition. By choosing the organic amine so that the absorbent composition has a suitable boiling point, a cyclic process for continuous reuse of all components of the absorbent composition, including the organic amine, is provided.

The glycol compound which acts as the liquid carrying medium for the organic amine in the absorbent composition and as the desiccant in the present gas washing process is preferably selected to provide a composition which is liquid in all stages of the present process, preferably a fluid, non-viscous compound of relatively high boiling point, such that the composition will remain in substantially liquid phase at the temperatures and pressures at which the gas washing cycle and absorbent regeneration stages are operated. The glycol compound used as the carrying medium is also selected to provide a liquid medium which is completely or highly miscible with the organic amine, with water, and preferably also with the hydrocarbon component of the composition at the concentrations of these components in the particular absorbent composition utilized. In general, suitable glycol compounds for this purpose are intended to include the alkylene glycols, the poly-(oxyalkylene) glycols and their ethers and esters. Thus, one of the most useful and readily available classes of glycol compounds for use in the present process are the members of the ethylene glycol polymer series, including ethylene glycol itself, diethylene glycol, triethylene glycol, tetraethylene glycol and higher ethylene glycol dehydration products, generally containing an average of not more than about 10 oxyethylene units per molecule. This series of ethylene glycol condensation products may also be named as members of the alpha-hydroxy-poly-(oxyethylene)-omega-hydroxy ethane series. Other suitable glycols include propylene glycol and the poly-(oxypropylene) glycols containing up to about 10 oxypropylene units per molecule, trimethylene glycol, the water-soluble alcohol ethers of said glycols, including the methyl, ethyl, propyl, and butyl ethers and the mono and di-esters of said glycols and poly-(oxyalkylene) glycols, such as the formates, acetates, diacetates, and propionates of both the mono- and polyethylene and the mono- and polypropylene glycol series. In designating the solvent component of the present absorbent composition as a glycol compound, it is intended that such term include the aforementioned glycols, poly-(oxyalkylene) glycols and their ethers and esters, as well as mixtures thereof.

Although the selection of the particular glycol, glycol ether or glycol ester or mixtures thereof utilizable in the present process, is largely dependent upon the boiling point and viscosity characteristics of the glycol at the particular gas washing temperatures and pressures, diethylene glycol or a mixture of diethylene and dipropylene glycols is generally preferred for most purposes, because of the relatively high boiling point and relatively low viscosity of these poly-(oxyalkylene) glycols at the feed gas treating temperatures, physical properties which permit their use over a wide range of treating conditions. The glycol compound is utilized in its substantially anhydrous condition (that is, preferably containing less than about 0.5% by weight of water) to thereby enable the absorbent composition to simultaneously remove water from the feed gas subjected to the present feed gas treatment, together with the acidic gas contaminant. For similar reasons, the absorbent composition is distilled in the regeneration stage of the present process to reduce the water content of the resulting lean absorbent composition to a value not substantially greater than 0.5% by weight and, preferably, to a somewhat lesser water content.

The component of the present absorbent composition referred to herein as an organic amine is selected from the general class of compounds characterized as organic bases containing one or more amino groups attached to a hydrocarbon or alkanol group. The preferred organic amines for use in the process are compounds having a relatively low vapor pressure, such that the liquid washing agent may be subjected to relatively high temperatures for decomposition of the organic amine salt of the acidic constituent formed during the treating stage to thereby regenerate the amine, without substantial vaporization of the amine from the rich composition. Suitable organic amines for this purpose may be selected from the aliphatic, aromatic, naphthenic and heterocyclic amines, as well as from the alkanol amines containing one or more amino and/or hydroxyl groups per molecule, although, generally, the aromatic mono- and diamines are advantageous because of their desirable solubility in the glycol compound. The amine may also be a primary, secondary or tertiary amine, the polyamines, alkanolamines, and high molecular weight alkylamines being particularly useful in the present gas absorbent composition. Typical primary amines include such specific compounds as n-butyl amine, sec-butyl amine, tert-butyl amine, one or more of the isomeric amyl amines and cyclopentyl and alkyl cyclopentyl amines, n-hexyl amine, cyclohexyl amine, methylcyclohexyl amine, dimethyl-cyclohexyl amine, ethyl-cyclohexyl amine, propyl-cyclohexyl amine, benzylamine, aniline, ortho-, meta-, and para-toluidine, ortho-, meta-, and para-phenylenediamine, and homologs of the above, preferably containing from 6 to about 18 carbon atoms per molecule. Typical secondary amines utilizable in the present absorbent composition include such compounds as dipropyl amine, diisopropyl amine, isopropyl-n-propylamine, n-butylmethyl amine, n-butylisopropyl amine, sec-butyl-methyl amine, sec-butyl-tert-butyl amine, di-isobutyl amine, di-n-hexyl amine, dicyclohexyl amine, propyl-nonyl amine, dioctyl amine, dinonyl amine, propyldodecyl amine, tolylisopropyl amine, N-monomethyl aniline, piperidine, morpholine, and homologs and analogs thereof. Typical tertiary basic amines suitable as the organic amine component of the present liquid washing agent include such compounds as triethyl amine, tri-n-propyl amine, tri-isopropyl amine, isobutyl-dibutyl amine, the various tributyl amines, triamyl amines, and other homologs including the trialkyl amines containing up to about 20 carbon atoms per molecule. The tertiary amine class of compounds useful as the organic amine component may also be selected from the aromatic-substituted amino compounds such as dimethylaniline, p-N,N-dimethyl-methylaniline and heterocyclic tertiary amines such as N-isopropylpiperidine, pyridine, picoline, lutidine, quinoline, etc. Another preferred class of amino compounds utilizable in the present gas absorbent composition are the mixed primary-secondary amines of the type characterized as the polyalkylene polyamines, such as diethylene triamine, tetraethylene penta-amine and other polyalkylene polyamines. Still another preferred class of amines useful in the present process are the alkanol amines such as ethanolamine, propanolamine, isopropanolamine, n-butanolamine, diethanolamine, triethanolamine, and other polyalkanolamines.

The hydrocarbon constituent of the present absorbent composition is desirably selected from a class of hydrocarbons which is relatively soluble in the absorbent composition, such as a hydrocarbon containing a high ratio of carbon to hydrogen atoms, such as an aromatic hydrocarbon (benzene, toluene, xylene, naphthalene, methyl-naphthalene, etc.) an olefinic hydrocarbon (hexene, heptene, cyclohexene, cyclohexadiene, vinylcyclohexane, vinylcyclohexene, etc.) or a naphthenic hydrocarbon (such as methylcyclopentane, cyclohexane, methylcyclohexane, etc.). The hydrocarbon component of the absorbent composition is preferably present in an amount corresponding to from about 0.1 to about 10% by weight of the resulting lean composition. The hydrocarbon component introduces an absorbent component which may be stripped from the "spent" composition during the regeneration stage of the process with the water and released acidic gas contaminant, carrying the latter vapors from the regeneration zone into a suitable separation vessel for separately recovering the individual components of the vapor overhead, the hydrocarbon thereby acting in the capacity of an in situ stripping agent for the absorbent regeneration stage of the process. Its separate recovery from the overhead vapors enables the hydrocarbon to be continuously recycled in the process. The hydrocarbon solute of the glycol also tends to reduce the viscosity of the absorbent composition, enabling the latter to be pumped throughout the process with a minimum consumption of utilities, while at the same time the absorption efficiency is increased.

The distinctive feature of the present process upon which many of the advantages inherent in the use of the present gas absorbent composition depend is the substantial absence of water (preferably not more than about 0.5% by weight) in the liquid composition contacted with the feed gas stream contaminated with the acidic component. The extraction of acidic gases from a mixture of gases including the acidic gaseous component in the absence of water is believed to depend upon the formation of an addition complex salt between the organic amine and the acidic gaseous component and is further believed to involve an intermediate reaction between the gaseous acid and the glycol, glycol ether, or glycol ester, followed by reaction of the intermediate product with the organic amine to form the amine salt of the acidic component contacted with the feed gas during the gas washing operation. These reactions, which do not depend upon the presence of water in the system, are represented, for example, for a process utilizing a glycol or glycol ether, and hydrogen sulfide as the acidic gas, by the following illustrative equations:

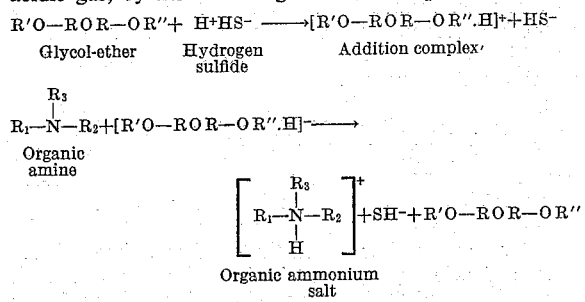

wherein R is an alkylene group, the R' and R'' groups are independently selected from alkyl and hydrogen, $R_1$ is an alkyl group or alkanol radical and $R_2$ and $R_3$ are selected from alkyl, alkanol, and hydrogen. In accordance with the mechanism which is believed to represent the present process, hydrogen sulfide exists in the system in its disassociated form as a proton and a negatively charged sulfhydryl radical which reacts with the glycol ether to form an addition complex of the proton and the ether. When the latter complex is contacted with the organic amine at the present absorption conditions, the organic amine which is a stronger base than the ether group, displaces the latter from the addition complex, thereby regenerating the free glycol ether and a salt of the organic amine with the sulfhydryl group is formed. The reaction proceeds in the entire absence of water, but minor amounts of water may be present without interfering with (although it may participate in) the essential reaction involved in the mechanism, as proposed. The process of absorption, represented by the above mechanism of the reaction, proceeds at all temperatures below the decomposition point of the amine salt of the acidic gas component, generally at temperatures of from 0° to about 100° C., the particular temperature to be utilized in the process also depending upon the viscosity of the composition at the selected temperature, the stability of the salts or complexes of the absorbed acid gases with the absorbent, and the vapor pressure of the amine or hydrocarbon diluent at such temperature. The amine salt of the sulfhydryl group dissolved or suspended in the regenerated glycol ether may thereafter be readily decomposed, for example, by heating the same above the decomposition point of the amine-acidic gas addition salt, generally at temperatures of from 30° to about 250° C. to release the hydrogen sulfide or other acidic gas from the rich absorbent composition and thereby regenerate the amine which dissolves in the glycol ether for recycling in the process. Although the above mechanism is believed to explain the reactions involved in the present absorption process, the scope of the invention is not to be limited necessarily in accordance with such proposed mechanism.

The gas absorbent composition of this invention may contain any suitable proportion of the organic amine to glycol compound which will be effective for the purpose intended, depending upon the concentration of acidic component in the gaseous feed stock to be treated, the charging rates of the gaseous feed stock and extractant, as well as other mutually dependent factors, the absorption composition containing sufficient organic amine to completely absorb all of the acidic contaminant of the gas fraction. In general, the washing liquid will contain at least 2%, up to about 30%, by weight of the organic amine in solution with the glycol compound, preferably from about 5 to about 15% by weight thereof.

During the absorption or washing step in which the solution of organic amine and hydrocarbon in the glycol compound is contacted with the contaminated feed gas, superatmospheric pressures are preferably utilized in order to enhance the rate of absorption of the acidic contaminant in the absorbent composition and thereby reduce the size and the number of contacting stages in the absorption equipment. Although any superatmospheric pressure is beneficial in promoting extraction of the acidic compound from the gaseous feed stock, pressures up to about 200 pounds per square inch are generally sufficient. One of the outstanding advantages of the present absorbent composition is the fact that the liquid effluent of the washing operation, containing the addition complex salt, representing the reaction product of the organic amine with the acidic gaseous component, may readily be regenerated by heating it to the decomposition point of the salt, thereby reconstituting the spent absorbent composition to a form suitable for recycling in the process. The decomposition also releases the absorbed acidic gas and permits it to be recovered for whatever purposes may be desired. These considerations apply generally to a wide variety of acidic gases normally encountered in petroleum refining and other chemical processes, including such gases as sulfur dioxide, carbon dioxide, hydrogen sulfide, hydrogen cyanide and others. In the actual regeneration of the absorbent composition herein provided, it is preferred that the rich absorbent containing the absorbed acidic gas as a salt with the organic amine is continuously boiled until substantially free of the acidic gas and until the water content of the regenerated absorbent composition is reduced to at least 0.5% by weight, the water absorbed with the acidic gas from the feed gas to the process being stripped from the spent absorbent by the vaporized hydrocarbon during the regeneration stage. In order to promote the release of acidic gas, water and hydrocarbon vapors and regeneration of the absorbent composition, a countercurrent stripping operation may be utilized in a separate regeneration tower, in which an inert gas, such as air, nitrogen or natural gas, is allowed to percolate upwardly in countercurrent flow relationship to the downwardly flowing fat composition, preferably maintained at the amine salt decomposition temperature, and preferably in a packed tower or bubble plate column of conventional design. For this purpose the rich absorbent composition may be introduced into the column at an inlet point intermediate the withdrawal of regenerated composition from the bottom of the column and the point of withdrawal of released acidic gas overhead from the top of the column.

The above principles involved in the process flow of the present invention are illustrated in the accompanying diagram which depicts a combined absorption-absorbent regeneration process for removing the acidic gas component from a feed gas stream containing moisture. Referring to the accompanying diagram, a contacting process which is preferably countercurrent, is provided, the contaminated feed gas as the desired absorption temperature and pressure being introduced into the process flow through line 1 in amounts controlled by valve 2. The feed gas is charged into the lower portion of absorption column 3 when a countercurrent contacting system is desired, flowing upwardly against a descending stream of liquid absorbent composition introduced into the upper portion of column 3 through line 4 in amounts controlled by valve 5. In general, the absorbent composition fed through line 4 is made up predominantly of a recycle composition recovered in the subsequent stages of the process as lean, regenerated absorbent, derived as hereinafter indicated. During the ascent of the feed gas through the liquid absorbent composition, the amine component of the latter composition reacts with the acidic gas contaminating the feed gas mixture to form an amine salt which progressively produces a so-called "spent absorbent" composition. The glycol compound comprising the absorbent composition absorbs any moisture which may be present in the feed gas and contributes to the decreasing activity of the spent absorbent composition. A treated gas product, substantially free of acidic gas contaminant and moisture is removed from the top of column 3 through line 6 and valve 7 for discharge from the process flow. The spent absorbent composition of more or less remaining activity, depending upon the rate of absorption, contains absorbed moisture and contaminating acidic gas, the spent absorbent being removed from the bottom of column 3 through line 8 at a rate controlled by valve 9 and transferred by means of pump 10 into line 11 which discharge the liquid composition into heat exchanger 12. Depending upon the temperature and pressure conditions maintained in the absorption stage of the process, heat exchanger 12 either increases or decreases the temperature of the liquid spent absorbent composition to the temperature level required for its regeneration. In general, the outlet of heat exchanger 12 will generally be at a lower pressure and at a higher temperature level than the outlet from absorber 3, regeneration of the spent composition being promoted by increasing the temperature and reducing the pressure on the spent absorbent composition; in this event, pump 10 may be omitted, flow control being effected by valve 9 or valve 12'. In a preferred method of operation, the absorption stage of the process is operated at an elevated temperature and at a sufficiently superatmospheric pressure to maintain the composition in substantially liquid phase and thereafter the liquid composition is transferred into the regeneration zone wherein the pressure is reduced and the sensible heat effects flash vaporization of a considerable proportion of the hydrocarbon component. The liquid composition generally at the aforementioned elevated temperature and reduced pressure enters regeneration column 13 at an intermediate point thereof in order to permit countercurrent flow of the resulting vapor and liquid streams therein. As the liquid composition enters column 13, flash vaporization of the most volatile components in the spent composition, including the hydrocarbon constituent and the water absorbed from the feed gas occurs. Simultaneously, the amine salt of the acidic gas component of the feed gas undergoes decomposition to free the acidic gas and the amine. In order to assist in the further decomposition of the amine salts and vaporization of the water and hydrocarbon constituents of the spent composition, additional heat may be supplied through reboiler coil 14 in the lower portion of column 13. Regeneration of the spent absorbent composition is also promoted by introducing an inert gas or vapor, such as air, nitrogen, flue gas, or other inert vapor, such as a gaseous hydrocarbon in the lower portion of column 13 through line 15 in an amount controlled by valve 16. The mixed vapors of inert gas (if any), hydrocarbon, water vapor and acidic gas contaminant, as well as a small amount of glycol compound and the organic amine component vaporized by virtue of the partial pressure of these ingredients at the regeneration temperature and pressure is removed from the vapor overhead stream from column 13 through line 17, the resulting mixed vapors being cooled in condenser 18 wherein the condensable components are liquefied by heat exchange in the condenser tubes. The resulting mixture of gases and liquids is withdrawn from condenser 18 through line 19 and valve 20 into receiver vessel 21 for separation by gravity into gaseous and liquid phases. A condensed aqueous phase accumulates as a lower liquid layer in receiver 21 and may be withdrawn therefrom through line 22 and valve 23 for discharge from the process flow. The non-condensable gases, including the acidic gas initially present in the feed gas and released from the spent absorbent composition accumulates in the upper portion of receiver 21 and is withdrawn for discharge from the process through line 24 and valve 25. An uppermost liquid layer accumulating in receiver 21 is withdrawn therefrom through standpipe 26, through line 27 in amounts controlled by valve 28, being discharged into line 29 through which the liquid residue of the absorbent composition accumulating in the bottom of column 13 is withdrawn at a rate determined by valve 30. Alternatively, some of the hydrocarbon withdrawn by line 27 may be introduced into line 15 (by means not shown) to supply additional scrubbing vapors.

By mixing the hydrocarbon recovered as overhead from the regeneration with the glycol and amine components comprising the liquid residue of the regenerated absorbent composition, the lean solvent is reconstituted to its original composition, suitable for use as recycle absorbent composition in the absorption stage of the process. In its thus reconstituted form, free of the water and acidic gas present in the spent composition, it may be recycled to the top of absorption column 3, for example, by means of pump 31 which discharges the absorbent into line 32, connecting with absorbent charge line 4, the composition thereafter flowing through the process flow as heretofore indicated.

The relationship of water content of the absorbent composition to the water content of the washed gas stream and the advantages of utilizing a substantially anhydrous reagent (compared with an aqueous composition) as well as the process conditions at which the present gas washing process is effected are further illustrated in the following examples.

EXAMPLE I

In the operation of the catalytic reforming process commonly known by its trade name: "Platforming," utilizing a catalyst consisting of combined platinum and halogen supported on alumina, a gaseous hydrogen stream made up partially of recycled hydrogen separated from the reactor vapor effluent product is charged into the reactors under pressure. Analysis of the non-condensable portion of the reactor vapor effluent which is recycled, together with make-up hydrogen separately supplied, after removal of light hydrocarbon compounds, indicates that the recycle gas stream contains about 28.9 grains of hydrogen sulfide per 100 s.c.f. of the recycle gas and has a relative humidity at 25° C. of 28%. This gas stream when utilized directly without prior treatment as the recycle hydrogen stream for the Platforming conversion, rapidly deactivates the catalyst and causes a pronounced drop in the conversion rate and efficiency. The reduction in catalytic conversion is directly attributed to both the water content and the hydrogen sulfide content of the hydrogen stream, as indicated by the stable conversion rate when utilizing a pure hydrogen stream containing no hydrogen sulfide or water and comparing the conversion when utilizing separate streams, each contaminated with only hydrogen sulfide or water.

In order to remove the aforementioned acidic gas and water vapor contaminants, the recycle gas stream was charged into the bottom of a stainless steel tower packed with Berle saddles over which an absorbent composition comprising a 12.5% solution of Armeen 12T (Armour and Co. technical dodecylamine), dissolved in a mixture of xylene and 100% diethylene glycol, containing 10% by weight of mixed xylene, was allowed to flow, the absorbent being charged into the top of the tower and permitted to percolate downwardly through the saddles, countercurrently to the upward flow of contaminated gas. The extractant solution was charged into the column at a temperature of 25° C. at a rate which minimized entrainment of the solution into the effluent gas stream and a resulting fat composition was withdrawn from the bottom of the column and reserved for regeneration. The exit gas stream from the top of the column was analyzed for its water and hydrogen sulfide content to determine the efficiency of contaminant removal. The resulting washed hydrogen stream has a relative humidity of less than 10% at 25° C., 10% relative humidity generally being considered as a safe level of water content of the hydrogen recycle stream for optimum conversion in the platforming process. The hydrogen sulfide content of the effluent gases from the washing operation was 1.8 grains/100 s.c.f. of washed gas, thus providing a percent hydrogen sulfide removal efficiency of about 95%.

In a Platforming conversion process in which the hydrogen stream purified as indicated above is utilized as the recycle gas stream, the catalyst remained active for an indefinite period of time; after 250 days on stream, the catalyst activity was substantially the same as its activity at the beginning of the conversion period and the structural form of the catalyst remained essentially the same.

The spent absorbent continuously removed from the bottom of the gas washing column is regenerated and the water and hydrogen sulfide removed from the contaminated gaseous feed stock stripped from the rich absorbent by a procedure which involves heating the spent absorbent in a distillation column under reflux conditions and removing overhead from the distillation column vapors of hydrogen sulfide and water with reflux of the xylene vapor overhead component continuously to the uppermost tray of the still. For this purpose, the spent absorbent was continuously charged into the middle of a bubble plate fractional distillation column, an overhead containing hydrogen sulfide, xylene, water and a small quantity of vaporized amine being taken overhead, the vapor condensed into an overhead receiver, and the upper, xylene layer in the receiver vessel (containing dissolved amine) continuously removed from the vessel and returned to the top tray of the column at a rate sufficient to provide a reflux ratio of 7 to 1. A net hydrocarbon fraction is removed from the receiver and recombined with the lean absorbent composition removed from the bottom of the still. The lower layer in the receiver vessel, consisting predominantly of water distilled from the spent absorbent, is withdrawn. The small amount of amine vaporizing from the absorbent composition tends to preferentially dissolve in the xylene and is refluxed back into the column. The regenerated or lean absorbent composition reboiled in the lower portion of the still, and removed from the bottom of the distillation column has substantially the same ratio of components as the composition initially prepared; that is, it consists of diethylene glycol containing about 12.5% Armeen 12T and 10% by weight of xylene. A non-condensable overhead from the receiver vessel consists predominantly of hydrogen sulfide and is removed from the receiver for discharge from the process flow.

EXAMPLE II

Utilizing the gas washing apparatus and procedure described in Example I, above, various contaminated gaseous feed stocks and various combinations of glycols, glycol ethers, and glycol esters as well as various amines and hydrocarbon diluents were utilized to effect the removal of the acidic gas component of several feed stocks. The following Table I presents the data relating to the efficiency of removal of both water and the acidic components of the gas streams utilized as feed stocks, as well as other physical data derived from the process. The contaminated gas mixture and liquid absorbent compositions were charged at the same rates and in accordance with the same procedure as specified in the run of Example I.

*Table I*

GAS SCRUBBING PROCESS UTILIZING GLYCOL AND GLYCOL DERIVATIVES COMBINED WITH AMINES AS WASHING AGENT

| Acidic Gas Mixture Charged | Glycol Solvent | Hydrocarbon Solvent | Amine | Relative Humidity of Effluent Gases [2] | Acidic Gas in Effluent | Percent Efficiency of Acidic Gas Removal |
|---|---|---|---|---|---|---|
| 32.2 Grains $H_2S$/100 s.c.f. $H_2$; 32% Relative Humidity at 25° C. | Di-ethylene Glycol, 100%. | Benzene | "Armeen C" [1] | 10 | 1.1 Grains $H_2S$/100 s.c.f. Washed Gas. | 97 |
| Same | Di-ethylene Glycol monomethyl ether. | Xylene | Same | 10 | 1.2 Grains $H_2S$/100 s.c.f. Washed Gas. | 96 |
| 25.6 Grains $H_2S$/100 s.c.f. $H_2$; 26% Rel. Humidity at 25° C. | Di-propylene Glycol, 100%. | Methyl-cyclo pentane. | "Armeen 12T" | 10 | 0.8 Grain $H_2S$ per 100 s.c.f. | 97 |
| Same | Same | Xylene | Quinoline | 10 | 0.5 Grain $H_2S$/100 s.c.f. Washed Gas. | 98 |
| Same | Same | Xylene | Pyridine | 10 | 0.9 Grain $H_2S$/100 s.c.f. Washed Gas. | 97 |
| 3.5 Grains $H_2S$/100 s.c.f. $H_2$; 40% Rel. Humidity at 25° C. | Same | Xylene | Quinoline | 10 | 0.5 Grain $H_2S$/100 s.c.f. Washed $H_2$. | 86 |
| 305 Grains $CO_2$/100 s.c.f. $H_2$—$CH_4$; 22% Rel. Humidity. | Tri-ethylene Glycol | Toluene | Tetra-ethylene pentamine. | 10 | 1.5 Grains $CO_2$/100 s.c.f. $H_2$—$CH_4$ Washed Gas. | 99 |

[1] "Armeen C" comprises a mixture of alkylamines averaging 12 carbon atoms per molecule, marketed by Armour and Co.
[2] Water content determined by infra-red analysis of the treated gas.

The results of the above experimental runs indicate that the substantially anhydrous poly-(oxy-alkylene) glycols, glycol ethers and alkylene glycol esters containing dissolved amine and combined with a hydrocarbon diluent soluble therein, are effective absorbent compositions for the removal of acidic gases from mixtures thereof with gases essentially insoluble in the compositions. These results further indicate that a substantially anhydrous absorbent composition is required to reduce the water content of the treated gas to a level suitable for use of the gas in a catalytic conversion process in which the catalyst is poisoned by moisture as well as the acidic gas component. The results of numerous tests on glycols, glycol ethers and glycol esters of varying water contents in gas-washing operations utilizing the above procedure indicate that the maximum tolerable water content of the absorbent composition essential to reduce the relative humidity of the treated gas to less than 10% at 25° C. is about 0.5% by weight of water.

I claim as my invention:

1. A combined absorption-absorbent regeneration process for treating a contaminated feed gas containing an acidic gaseous component which comprises contacting said feed gas with a liquid absorbent composition comprising an organic amine, a substantially anhydrous, hydrophilic glycol compound and a minor amount, based upon the glycol compound, of a hydrocarbon at least partially soluble in said glycol compound and vaporizable in the absorbent regeneration step, to thereby form a rich absorbent composition and a treated gas stream substantially free of moisture and said acidic gas component, separating said treated gas stream from said rich composition, separately distilling said rich composition and vaporizing said hydrocarbon and amine together with the acidic gaseous component and any water absorbed by the composition from said feed gas until the resulting composition residue contains not more than 0.5% by weight of water and is substantially free of acidic gas, separating the resulting overhead into an acidic gas, a water phase and a separate hydrocarbon phase containing amine and glycol compound, and thereafter combining said hydrocarbon phase with said composition residue and recycling the resulting mixture to contact with said feed gas.

2. The process of claim 1 further characterized in that the glycol component of said composition is selected from the group consisting of the mono and polyethylene glycols.

3. The process of claim 1 further characterized in that said hydrocarbon is an aromatic hydrocarbon at least partially soluble in said glycol compound.

4. The process of claim 3 further characterized in that said aromatic hydrocarbon is a member of the benzene series.

5. The process of claim 4 further characterized in that said aromatic hydrocarbon is toluene.

6. The process of claim 4 further characterized in that said aromatic hydrocarbon is xylene.

7. The process of claim 1 further characterized in that said organic amine is a polyalkylene polyamine.

8. The process of claim 7 further characterized in that the alkylene group of said polyalkylene polyamine is ethylene.

9. The process of claim 1 further characterized in that the absorbent contacting step is effected at a superatmospheric pressure sufficient to maintain said composition in substantially liquid phase.

10. The process of claim 9 further characterized in that the rich composition formed in the absorbent contacting step is distilled at a reduced pressure, relative to the pressure maintained in said contacting step.

11. A process for removing hydrogen sulfide and water from a hydrogen recycle gas stream which comprises countercurrently washing said gas stream with an absorbent composition containing not more than about 0.5% by weight of water, xylene, an alkyl amine containing from 6 to about 18 carbon atoms and diethylene glycol at a temperature and pressure sufficient to maintain said composition in substantially liquid phase, thereafter separating a treated recycle hydrogen stream from a resulting rich absorbent composition containing said hydrogen sulfide, distilling from said rich composition sufficient xylene to substantially free said composition of hydrogen sulfide and to reduce its water content to not more than about 0.5% by weight, thereby forming an overhead comprising xylene, water, hydrogen sulfide, amine and diethylene glycol, separating the resulting overhead into a stream of hydrogen sulfide gas, a water stream and a separate xylene stream containing amine and diethylene glycol, combining said xylene stream with the resulting regenerated absorbent composition and recycling the regenerated lean absorbent composition to said countercurrent washing step.

References Cited in the file of this patent
UNITED STATES PATENTS

| | | |
|---|---|---|
| 2,177,068 | Hutchinson | Oct. 24, 1939 |
| 2,550,446 | Blohm et al. | Apr. 24, 1951 |